(12) United States Patent
Park et al.

(10) Patent No.: US 12,009,884 B2
(45) Date of Patent: Jun. 11, 2024

(54) ELECTRONIC DEVICE PERFORMING POWERLINE COMMUNICATION AND OPERATION METHOD THEREOF

(71) Applicant: LG ELECTRONICS INC., Seoul (KR)

(72) Inventors: Hee Gu Park, Seoul (KR); Dong Seong Kim, Seoul (KR); Kyung Jae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 17/792,778

(22) PCT Filed: Jan. 29, 2021

(86) PCT No.: PCT/KR2021/001200
§ 371 (c)(1),
(2) Date: Jul. 14, 2022

(87) PCT Pub. No.: WO2022/080597
PCT Pub. Date: Apr. 21, 2022

(65) Prior Publication Data
US 2023/0044930 A1 Feb. 9, 2023

(30) Foreign Application Priority Data
Oct. 16, 2020 (KR) .................. 10-2020-0134592

(51) Int. Cl.
*H04B 3/54* (2006.01)
*H04L 12/10* (2006.01)
(Continued)

(52) U.S. Cl.
CPC .............. *H04B 3/54* (2013.01); *H04L 12/10* (2013.01); *H04L 27/04* (2013.01); *H04L 67/34* (2013.01)

(58) Field of Classification Search
CPC ........ A47L 9/28; A47L 9/2894; A47L 9/2857; H04B 3/54; H04B 3/548; H04L 67/34; H04L 27/04; H04L 12/10
See application file for complete search history.

(56) References Cited

U.S. PATENT DOCUMENTS

2019/0387943 A1    12/2019  Kim
2020/0187741 A1*   6/2020   Villaroman ............. A47L 5/225
2022/0173768 A1*   6/2022   Chang .................... H04B 3/548

FOREIGN PATENT DOCUMENTS

EP    2487803       8/2012
JP    2009-050294   3/2009
(Continued)

OTHER PUBLICATIONS

International Search Report dated Jul. 13, 2021 issued in Application No. PCT/KR2021/001200.

*Primary Examiner* — David S Huang
(74) *Attorney, Agent, or Firm* — KED & ASSOCIATES, LLP

(57) ABSTRACT

Provided is an electronic apparatus comprising a main body and a kit connected to the main body, wherein the main body comprises a battery, a first motor, an electric wire connected to the battery and a first controller connected to the electric wire, wherein the kit comprises a second motor supplied with power through the electric wire and a second controller connected to the electric wire, wherein the first controller comprises a first signal generator configured to generate a signal to be transmitted to the kit and a first modulator configured to modulate the signal generated by the first signal generator, and wherein the signal modulated by the first modulator is transmitted to the second controller through the electric wire.

20 Claims, 11 Drawing Sheets

(51) Int. Cl.
*H04L 27/04* (2006.01)
*H04L 67/00* (2022.01)

(56) References Cited

FOREIGN PATENT DOCUMENTS

| | | |
|---|---|---|
| KR | 10-0798325 | 1/2008 |
| KR | 10-0820576 | 4/2008 |
| KR | 10-2009-0102157 | 9/2009 |
| KR | 10-0949588 | 3/2010 |
| KR | 10-2016-0115586 | 10/2016 |
| KR | 10-2019-0089795 | 7/2019 |
| WO | WO 2011/043514 | 4/2011 |

* cited by examiner

FIG. 6

| Header (1byte) | Length (1byte) | Type (1byte) | Data (variable) (1~5byte) | Tail (1byte) | Checksum (1byte) |

FIG. 7
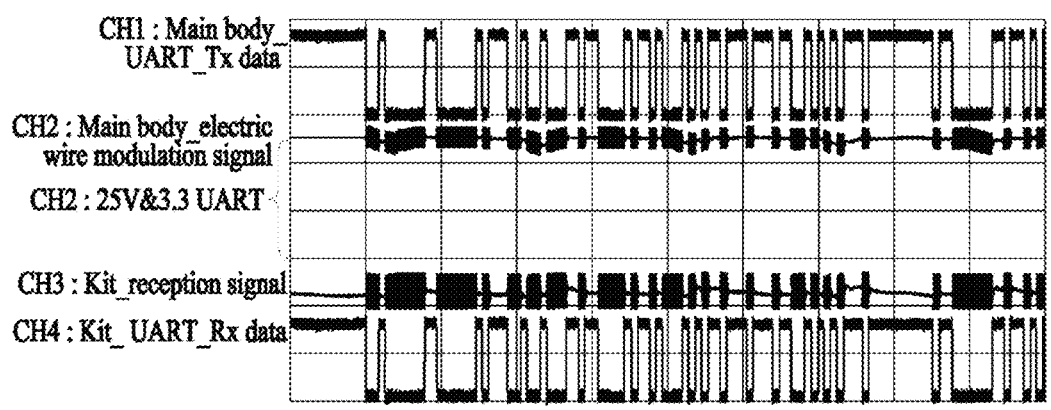
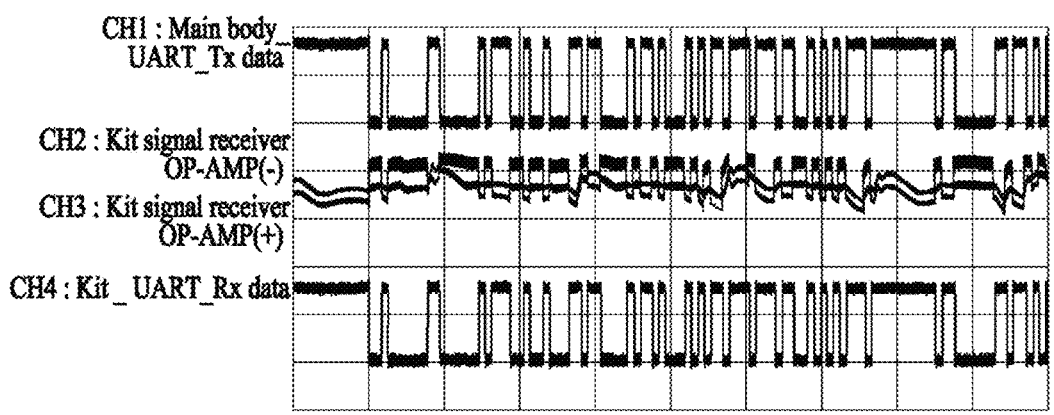

ELECTRONIC DEVICE PERFORMING POWERLINE COMMUNICATION AND OPERATION METHOD THEREOF

CROSS-REFERENCE TO RELATED PATENT APPLICATIONS

This application is a U.S. National Stage Application under 35 U.S.C. § 371 of PCT Application No. PCT/KR2021/001200, filed Jan. 29, 2021, which claims priority to Korean Patent Application No. 10-2020-0134592, filed Oct. 16, 2020, whose entire disclosures are hereby incorporated by reference.

TECHNICAL FIELD

This disclosure relates to an electronic apparatus that provides communication between a main body and a kit connected to the main body, and a method of operating the same. Specifically, the electronic apparatus and the method operating the same provide communication between the main body and the kit connected to the main body using an electric wire.

BACKGROUND ART

With the development of electronic technology, various electronic apparatuses are being used in our daily life. For example, a vacuum cleaner is an electronic apparatus that operates a motor based on receiving power to suck or wipe dust or foreign substances in a clearing target area to perform cleaning.

Such vacuum cleaners may be divided into a manual cleaner that a user directly moves to perform cleaning and an automatic cleaner with which the user performs cleaning while the automatic cleaner driving by itself. In the case of the manual cleaner, according to the shape of the cleaner, for example, it may be classified into a canister-type cleaner, an upright-type cleaner, a handy-type cleaner and a stick-type cleaner.

The manual cleaner may include, for example, at least one of a kit (or a cleaning kit) that is a part that performs cleaning operations (for example, sucking foreign substances and wiping foreign substances) adjacent to a target to be cleaned, a pipe (or a stick) that communicates with a nozzle, is adjustable in length, and provides a passage for foreign substances, a motor that provides power to suck in foreign substances, and a controller that controls the output of the motor.

A user may detach a kit including a nozzle from the main body including the motor providing suction force. Further, a plurality of kits connectable to the main body may be present. For example, a first kit capable of wiping with water or a second kit capable of sucking in foreign substances may be selectively attached to and detached from one main body.

Recently, due to the development of electronic technology, studies for adaptively changing the operation of the vacuum cleaner based on the state of the vacuum cleaner have been actively conducted in order to increase the effectiveness of the cleaning operation of the cleaner beyond simple cleaning operations. For example, when the vacuum cleaner is moved quickly while the motor output is constant, the amount of sucked foreign substances may be reduced compared to the case of moving the vacuum cleaner slowly, and if foreign substances adhere to the nozzle and interfere with the cleaning operation, the amount of sucked foreign substances may decrease. Accordingly, it is required to improve the effect of the cleaning operation by controlling the suction amount of foreign substances according to the operation state of the cleaner.

In relation to such a vacuum cleaner, there is a prior document.

Prior art 1: Korean Laid-open Patent Publication No. 10-2019-0089795

Prior art 1 includes acquiring information about the moving speed and the moving direction of a head from a speed measuring part included in the head (for example, a kit) that sucks foreign substances, and controlling a motor to have the selected minimum output by selecting the minimum output of the motor for sucking foreign substances using the acquired information. However, even though prior art 1 describes that information is acquired by using the speed meaning part, prior art 1 does not describe how the information is acquired. In this regard, in order to exchange information between the speed measuring part and a controller, various components included in the cleaner, or additional wiring may be required for performing separate wired/wireless communication protocols (for example, wired communication, radio frequency (RF), ZigBee, Bluetooth and Wi-Fi). However, in this case, there are structural limitations and cost constraint of the cleaner.

DISCLOSURE OF INVENTION

Technical Goals

An aspect provides an electronic apparatus and a method of operating the same by which it is possible to transmit information from a kit to a main body based on communication using an electric wire included in the electronic apparatus, and that guarantees the performance of communication using the electric wire regardless of the usage environment of the electronic apparatus.

However, the problem to be solved by the present disclosure is not limited as described above, and although not mentioned, purposes that can be clearly understood by those of ordinary skill in the art to which the present disclosure belongs from the following description may be included.

Technical Solutions

According to an aspect, there is provided an electronic apparatus including a main body and a kit connected to the main body, wherein the main body includes a battery, a first motor, an electric wire connected to the battery and a first controller connected to the electric wire, wherein the kit includes a second motor supplied with power through the electric wire and a second controller connected to the electric wire, wherein the first controller includes a first signal generator configured to generate a signal to be transmitted to the kit and a first modulator configured to modulate the signal generated by the first signal generator, and wherein the signal modulated by the first modulator is transmitted to the second controller through the electric wire.

According to another aspect, there is also provided a method of operating an electronic apparatus including a main body and a kit connected to the main body, the method including generating a signal to be transmitted from the main body to the kit, modulating the generated signal, and transmitting the modulated signal from the main body to the kit through an electric wire connected to a battery of the main body, wherein the main body includes the battery, a first motor, the electric wire, and a first controller connected to the electric wire, and wherein the kit includes a second motor supplied with power through the electric wire, and a second controller connected to the electric wire.

According to another aspect, there is also provided a method of operating an electronic apparatus including a main body and a kit connected to the main body, the method including connecting to a server related to the electronic apparatus based on wireless communication, acquiring update data for each of the one or more kits related to the electronic apparatus based on a connection with the server, identifying a kit connected to the main body among the one or more kits, and when update data corresponding to the kit connected to the main body is identified in the acquired update data, modulating a signal corresponding to the identified update data and transmitting a modulated signal from the main body to the kit connected to the main body through an electric wire connected to a battery of the main body, wherein the main body includes the battery, a first motor, the electric wire and a first controller connected to the electric wire, and wherein the kit includes a second motor supplied with power through the electric wire, and a second controller connected to the electric wire.

Effects

According to example embodiments, the electronic apparatus and the method operating the same may enable communication between the main body and the kit even if there is no separate writing for communication by using an electric wire for providing power.

Further, according to example embodiments, the electronic apparatus and the operating method may allow communication to be performed using high frequency wave, so that high-speed data communication may be effectively performed together with the supply of power.

Further, according to example embodiments, the electronic apparatus and the operating method may allow the kit to perform communication only by connecting the kit with an electric wire receiving power from the main body by allowing the electronic apparatus including a main body and a replaceable kit to perform power line communication between the kit and the main body, and may identify the kit by performing power line communication utilizing the wider bandwidth, and a large amount of data, such as a firmware update of the kit, may be provided via power line communication.

However, the effects obtained in the present disclosure are not limited to the above-described effects, and other effects not mentioned will be clearly understood by those of ordinary skill in the art to which the present disclosure belongs from the following description.

BRIEF DESCRIPTION OF DRAWINGS

FIG. 6 is a diagram for explaining a structure of a packet frame transmitted from an electronic apparatus according to an example embodiment of the present disclosure.

FIG. 7 illustrates examples of waveforms of signals transmitted and received by an electronic apparatus according to an example embodiment of the present disclosure.

BEST MODE FOR CARRYING OUT THE INVENTION

Figure 1:
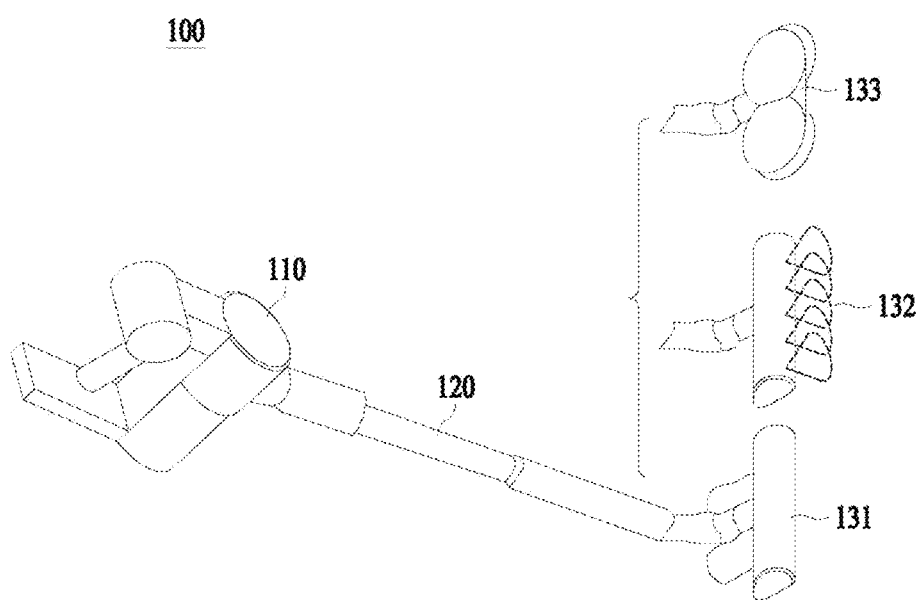
FIG. 1 is a diagram illustrating an example of an electronic apparatus including a main body and kits.

Hereinafter, implementations of the present disclosure will be described in detail with reference to the drawings so that those skilled in the art to which the present disclosure pertains can easily perform the present disclosure. The present disclosure may be implemented in many different forms and is not limited to the implementations described herein.

For brevity of description, a part that is not related to the description may be omitted, and the same or similar components are denoted by the same reference numerals throughout the specification. Further, some implementations of this application will be described in detail with reference to exemplary drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

In implementing the present disclosure, it will be further understood that the terms "comprise", "include", or "have" when used herein, specify the presence of stated features, integers, steps, operations, elements, and/or components, but do not preclude the presence or addition of one or more other features, integers, steps, operations, elements, components, and/or groups thereof.

Further, in implementing the present disclosure, for convenience of explanation, components may be described by being subdivided; however, these components may be implemented in a device or a module, or a single component may be implemented by being divided into a plurality of devices or modules. Hereinafter, an electronic apparatus according to the example embodiments will be described.

Hereinafter, an electronic apparatus according to the example embodiments will be described.

FIG. 1 is a diagram illustrating an example of an electronic apparatus including a main body and kits. FIG. 1 illustrates an example of an electronic apparatus including a main body 110 and kits 131, 132 and 133 connectable to the main body.

Referring to FIG. 1, an electronic apparatus 100 may include the main body 110, a pipe (or a stick) 120, and the kits 131, 132 and 133. The main body 110 of the electronic apparatus 100 may be connected to the kits 131, 132 and 133 with the pipe 120 interposed therebetween. One or more kits 131, 132 and 133 connectable to the main body 110 may be present as illustrated. The form or shape of each of the kits 131, 132 and 133 may be implemented differently, and accordingly, the functions corresponding to each of the kits 131, 132 and 133 may be different. For example, the first kit 131 may be a kit including a nozzle implemented to easily clean a carpet, the second kit 132 may be a kit implemented to easily clean a dark space, and the third kit 133 may be a kit implemented to facilitate wet-wiping.

Each of the kits 131, 132 and 133 may be selectively combined with the main body 110 according to the need of a user. Accordingly, the electronic apparatus 100 may easily implement various cleaning operations. Further, the kit may exist in various forms other than those described herein, and since it is easy for those skilled in the art to understand other forms, a detailed description thereof will be omitted.

The electronic apparatus 100 may be implemented as a cleaner (for example, a vacuum cleaner) as illustrated. However, the present disclosure is not limited thereto, and the present disclosure may be applied to various electronic apparatuses requiring communication between the main body 110 and the kits 131, 132 and 133.

In some example embodiments, the kits 131, 132 and 133 may be referred to as a nozzle, but the present disclosure is not limited to such a term.

Figure 2:
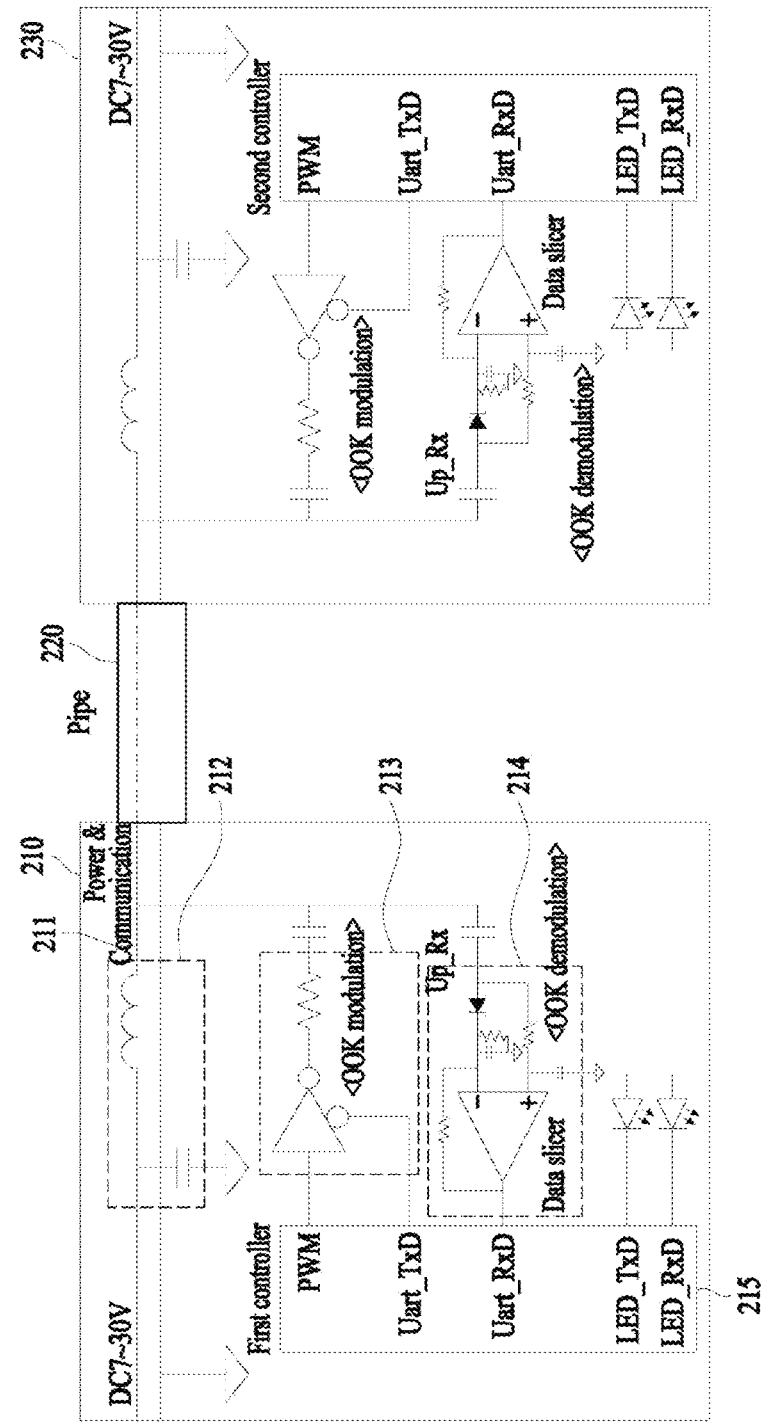
FIG. 2 is a diagram for explaining a circuit constitution of an electronic apparatus according to an example embodiment of the present disclosure.

FIG. 2 is a diagram for explaining a circuit constitution of an electronic apparatus according to an example embodiment of the present disclosure. Specifically, FIG. 2 conceptually illustrates a circuit of a part of the electronic apparatus.

Referring to FIG. 2, the electronic apparatus may include a main body 210, a pipe 220 and a kit 230. The main body 210 and the kit 230 may be connected through the pipe 220. In an example embodiment, the main body 210 may include a battery (not illustrated) for supplying power, and the battery may be connected to one end of an electric wire 211 (or a power line) and may be included in the kit 230 from the main body 210 through the pipe 220. Accordingly, power may be supplied to the main body 210 and the kit 230.

Further, in an example embodiment, communication may be performed through two electric wires (or power lines) between the main body 210 and the kit 230, and the communication from the main body 210 to the kit 230 as well as bidirectional communication from the kit 230 to the main body 210 may be performed. Through this, the main body 210 may perform high-speed data communication while supplying 100w power to the kit 230. According to the example embodiment, communication via the electric wires may be referred to as power line communication or communication in power line, but the present disclosure is not limited to the terms.

According to the example embodiment, the main body 210 may include a modulator 213 that modulates a signal generated to be transmitted to the kit 230. The modulator 213 may perform on-off modulation using an on-off keying (OOK) modulation chipset. For example, the main body 210 (for example, a controller 215 of the main body 210) may generate a universal asynchronous receiver/transmitter (UART) signal (or asynchronous serial communication data) and the carrier frequency which is high frequency (for example, the frequency of 10 MHz). The modulator 213 may load the generated UART signal on the carrier frequency which is high frequency and then couple it to an electric wire (for example, AC coupling) to transmit it to the kit 230. At this time, the coupling may be made by a capacitor positioned at an output terminal of the modulator 213. A more detailed description related thereto may refer to FIG. 3. Further, according to an example embodiment, as a carrier frequency for communication, frequency other than 10 MHz may also be used.

In the example embodiment, the main body 210 may include a signal receiver 214 for receiving a signal transmitted by the kit 230. The signal transmitted by the kit 230 may have characteristics corresponding to a signal modulated by the modulator 213. As will be described later, according to an example embodiment, the kit 230 may have a configuration corresponding to the modulator 213 in order to modulate a signal to be transmitted to the main body 210. Based on the configuration, the kit 230 may transmit data to the main body 210 by loading data on the carrier frequency which is high-frequency, and accordingly, the main body 210 may receive a signal modulated based on the carrier frequency which is high frequency.

In the example embodiment, the signal receiver 214 may include an OP-Amp and an envelope detector. The signal receiver 214 may include an RC filter connected to a non-inverting input terminal of a first OP-Amp, and the envelope detector may be connected to an inverting input terminal of the first OP-Amp.

In the example embodiment, the signal receiver 214 may extract a moving average value of a high frequency region so that the extracted moving average value is input to the non-inverting input terminal of the first OP-Amp. The signal receiver 214 may cause an envelope detection signal to be input to the inverting input terminal of the first OP-Amp after performing envelope detection for the high frequency region. The signal receiver 214 may compare the moving average value with the envelope detection signal and invert the output.

In the example embodiment, the main body 210 may include an LC circuit 212 that filters the signal transmitted to the kit 230 from being transmitted to a power source or other components. By providing such an LC filter, it is possible to minimize the influence of power supply noise on power line communication or the influence of communication signals on power supply.

In the example embodiment, the kit 230 may be implemented in a structure symmetrical to the main body 210. That is, the circuit diagram of the kit 230 may correspond to the main body 210. For example, the kit 230 includes a modulator (corresponding to the modulator 213 of the main body 210) that modulates a signal to be transmitted to the main body 210, and a signal receiver (corresponding to the signal receiver 214 of the main body 210) that receives a signal from the main body 210. Further, the kit 230 may include an LC filter (corresponding to the LC filter 212 of the main body 210) that filters the signal transmitted to the main body 210 so that the signal is not transmitted to other components.

Further, in an example embodiment, signal receivers (for example, the signal receiver 214 of the main body 210 and the signal receiver of the kit 230) may receive a communication signal through data slice. For example, the signal receivers may effectively receive a signal through the envelope detection, a moving average value, and the configuration of the comparison inversion and demodulation circuit.

Figure 3:
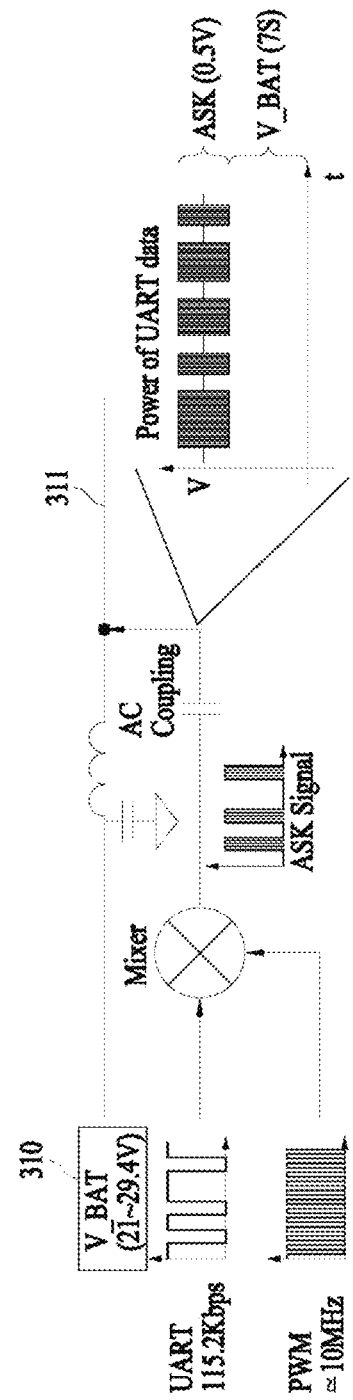
FIG. 3 is a diagram for explaining a signal generated by an electronic apparatus according to an example embodiment of the present disclosure.

FIG. 3 is a diagram for explaining a signal generated by an electronic apparatus according to an example embodiment of the present disclosure. Specifically, FIG. 3 is a diagram for describing signal modulation of an electronic apparatus in more detail.

Referring to FIG. 3, the electronic apparatus may include a battery 301 (or a power supply part). The electronic apparatus supplies power to each component included in the electronic apparatus using the battery 301. The battery 301 may be a built-in battery or a replaceable battery, but is not limited thereto and may be implemented in various forms for supplying power.

Power to the components of the electronic apparatus may be supplied through an electric wire (or a power line) connected to the battery 301. The electronic apparatus may transmit a signal to the electric wire to perform communication between the main body and the kit.

Specifically, a controller (hereinafter, a first controller) of the main body may generate data and the carrier frequency which is high frequency, for communication with the kit. The data for communication may correspond to a UART signal of the drawing as asynchronous serial communication data. The carrier frequency which is high frequency may include, for example, the carrier frequency corresponding to 10 MHz.

The data for communication may be carried on the carrier frequency by a modulator (for example, a mixer of FIG. 3). For example, the modulator may perform modulation by loading data for communication on the carrier frequency based on the on-off keying (OOK) scheme (or, an amplitude shift keying (ASK) method). Here, the ASK modulation may be amplitude shift method modulation used for digital signal transmission, and the OOK modulation may be a type of ASK modulation. In an example embodiment, the modulation method may be appropriately changed and applied, and a detailed description of a specific modulation method will be omitted.

A modulation signal (for example, the ASK signal of FIG. 2) may be generated based on the modulation. Based on the AC coupling, a modulated signal may be transmitted from the main body to the kit on the electric wire.

The communication based on the electric wire of the electronic apparatus according to the present disclosure as described above has the advantage of being capable of building a communication network at low cost without installing an additional communication line using an already secured electric wire. Further, the electronic apparatus of the present disclosure may modulate a signal based on the carrier frequency which is high frequency, and by performing data communication using the modulated signal, a large amount of data may be communicated at high speed (for example, 115,200 bits per second (bps)). Meanwhile, in an example embodiment, the communication speed may be variably determined based on the state of power supplied to the electric wire and the state of the battery 301 of the electronic apparatus.

Figure 4:
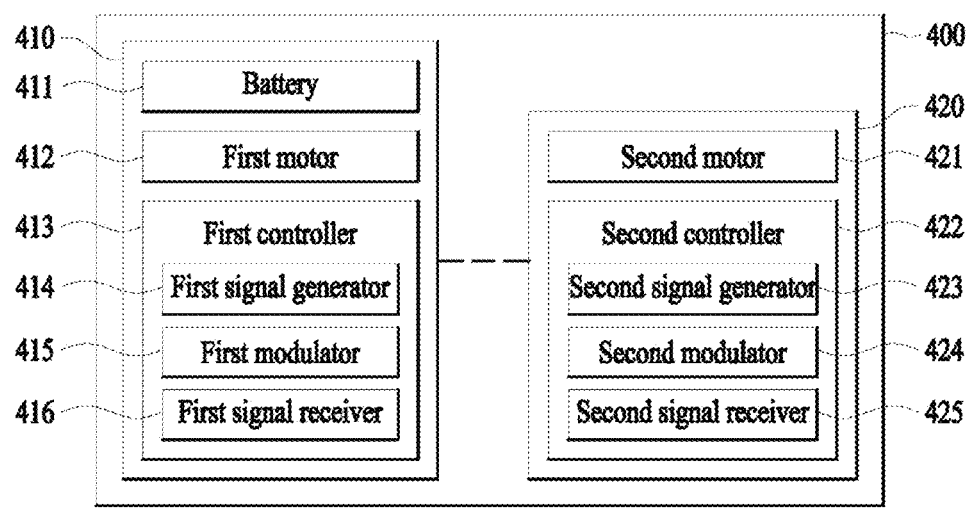
FIG. 4 is a functional block diagram of an electronic apparatus according to an example embodiment of the present disclosure.

FIG. 4 is a functional block diagram of an electronic apparatus according to an example embodiment of the present disclosure. An element of an electronic apparatus 400, which will be described later, refers to a part that processes at least one function or operation, and it may be implemented in hardware or software, or a combination of hardware and software.

Referring to FIG. 4, the electronic apparatus 400 may include a main body 410 and a kit 420. The main body 410 may include a battery 411, a first motor 412 and a first controller 413, and the kit 420 may include a second motor 421 and a second controller 422.

Although not illustrated, the electronic apparatus 400 may further include a pipe connecting the main body 410 and the kit 420, and an electric wire connecting the main body 410 and the kit 420 may be disposed in the pipe. In the example embodiment, foreign substances may be sucked through the kit 420, and in this case, the sucked foreign substances may move to the main body 410 through the pipe and be stored in a foreign substance storage part.

The main body 410 may include the battery 411 for providing power for operation of the electronic apparatus 400, the first motor 412 for controlling an output for a cleaning operation of the electronic apparatus 400, and the first controller 413 for controlling the overall operation of the electronic apparatus 400.

The battery 411 may supply power to drive the electronic apparatus 400. Specifically, the battery 411 may be connected to each component of the electronic apparatus 400 through the electronic wire to supply power to each component of the electronic apparatus 400. Based on the supply of power, the electronic apparatus 400 may perform various operations.

The battery 411 may be implemented as an internal or external type, and may be implemented as a wired or wireless type. However, the present disclosure is not limited thereto, and the battery 411 may be implemented in various forms.

The first motor 412 may provide power for a cleaning operation of the electronic apparatus 400. For example, the first motor 412 may provide suction force to the kit 420. For example, when the first motor 412 operates, force to suck foreign substances may be generated in the kit 420, and the foreign substances may be sucked into the kit 420. For the first motor 412, various known motors used in a cleaner (or a vacuum cleaner) may be used.

The first controller 413 may control the overall operation of the electronic apparatus 400. The first controller 413 may be implemented to include at least one processor, and may execute stored instructions to control the operation of the electronic apparatus 400.

The first controller 413 may include a first signal generator 414, a first modulator 415 and a first signal receiver 416. Specifically, the first controller 413 may generate a signal to be transmitted to the kit 420 using the first signal generator 414, and after modulating the generated signal using the first modulator 415, may transmit the modulated signal to the kit 420. Further, the first controller 413 may receive a signal from the kit 420 through the first signal receiver 416.

The first controller 413 may be connected to the battery 411 through an electric wire. The first controller 413 may be connected between the battery 411 and the second controller 422 of the kit 420. In an example embodiment, the electric wire may include a first LC filter (for example, the LC filter 212 of FIG. 2) between the battery 411 and the first controller 413.

The first signal generator 414 may generate a signal to be transmitted to the kit 420. The signal to be transmitted to the kit 420 may include, for example, a data signal related to the control of the kit 420. More specifically, for example, the signal to be transmitted to the kit 420 may include at least one of information on target suction power based on user input or settings, various data (for example, duration of an action, speed of an action, intensity of an action and a type of an action (for example, water jet and steam jet)) representing a user's intention related to an operation (or cleaning operation) of the electronic apparatus 400, and update data of the kit 420. For another example, the information contained in the signal to be transmitted to the kit 420 may include at least one of control information for suction power related to the kit 420, information on a user input related to an operation of the kit 420, revolution per minute (RPM) control information of the second motor 421, and information about the battery 411 (for example, the remaining capacity of the battery 411).

The first modulator 415 may modulate the signal generated by the first signal generator 414. The first modulator 415 may perform on-off modulation (or ASK modulation) on the signal generated by the first signal generator 414. Specifically, the first modulator 415 may modulate the signal generated by the first signal generator 414 using the carrier frequency (hereinafter, a carrier) which is high frequency. In this case, the modulation method used may be the on-off modulation.

The frequency of the carrier related to the first modulator 415 is the high frequency, and may be higher than the frequency of the signal generated by the first signal generator 414. For example, the frequency of the carrier may be equal to or higher than 1 MHz. For another example, the frequency of the carrier may be 10 MHz. However, carriers are not limited to the examples, and may be implemented with various high-frequency carriers. As such, when modulation is performed based on a high-frequency carrier, high-speed communication may be achieved, and accordingly, a large amount of data may be transmitted from the main body 410 to the kit 420. As will be described later, the kit 420 may also include a second modulator 424 corresponding to the first modulator 415. In this case, a large amount of data may also be transmitted from the kit 420 to the main body 410 at high speed.

The signal modulated by the first modulator 415 may be transmitted from the first controller 413 to the second controller 422. Specifically, the signal modulated through the first modulator 415 based on AC coupling may be transmitted from the main body 410 to the kit 420 through an electric wire. The signal modulated through the first modulator 415 may be transmitted from the main body 410 to the kit 420 on the electric wire based the AC coupling.

The first signal receiver 416 may receive a signal from the kit 420. In this case, the signal received by the first signal receiver 416 may include the modulated signal. The received signal may include, for example, the signal modulated based on the high-frequency carrier and the on-off keying scheme.

Although not illustrated, in an example embodiment, the first signal receiver 416 may include a first OP-Amp and a first envelope detector. Further, the first signal receiver 416 may further include a first RC filter connected to a non-inverting input terminal (+ terminal) of the first OP-Amp. In this case, the first envelope detector may be connected to an inverting terminal (− terminal) of the first OP-Amp.

In the example embodiment, a first capacitor may be located between the first RC filter and the first envelope detector, and the electric wire (or an electric wire connected to a battery).

In the example embodiment, the first signal receiver 416 may extract a moving average value of a high frequency region so that the extracted moving average value is input to the non-inverting input terminal of the first OP-Amp. The first receiver 416 (or an envelope detector) may allow an envelope detection signal to be input to the inverting input terminal of the first OP-Amp after performing envelope detection for the high frequency region. The first signal receiver 416 may compare the moving average value with the envelope detection signal and invert the output. Through this, a signal region representing data (or information) may be more accurately extracted and information may be effectively acquired.

The kit 420 may include the second motor 421 and the second controller 422. Although not illustrated, according to an example embodiment, the kit 420 may include various components that may be constituted to clean a surface to be cleaned by removing foreign substances such as a rotation shaft formed long left and right, a brush part including a brush protrudingly disposed on the outer periphery of the rotation shaft, a rotating cleaning part provided to rotate parallel to the surface to be cleaned, and a suction flow path for sucking air and foreign substances with the force for sucking foreign substances supplied by the first motor 412.

The second motor 421 may include at least one motor for driving the kit 420. For example, the second motor 421 may include a motor for driving the rotating cleaning part, a pump and a spray nozzle for discharging water. However, the present disclosure is not limited thereto, and depending on an example embodiment, various components may be included or some components may be omitted.

The second controller 422 may include a second signal generator 423, the second modulator 424, and a second signal receiver 425. The second signal generator 423 may correspond to the first signal generator 414 of the main body 410, the second modulator 424 may correspond to the first modulator 415 of the main body 410, and the second signal receiver 425 may correspond to the first signal receiver 416 of the main body 410. In this case, constitutions of the main body 410 excluding the battery 411 and the kit 420 may be symmetrical.

For example, the second controller 422 may include the second signal generator 423 that generates a signal to be transmitted to the main body 410, the second modulator 424 that modulates the signal generated by the second signal generator 423, and the second signal receiver 425 that receives the signal transmitted by the first controller 413.

The second signal generator 423 may generate a signal to be transmitted from the second controller 422 to the main body 410. The generated signal may be modulated based on a high frequency carrier. In this case, the on-off keying scheme may be used for modulation. The high frequency carrier may correspond to the carrier used in the first modulator 415, and the modulation method of the second modulator 424 may correspond to the modulation method of the first modulator 415.

The second signal receiver 425 may include a second OP-Amp, a second envelope detector connected to an inverting input terminal of the second OP-Amp, and a second RC filter connected to a non-inverting input terminal of the second OP-Amp. A second capacitor may be located between the second RC filter and the second envelope detector, and the electric wire.

Meanwhile, each component of the kit 420 may correspond to each component of the main body 410, but information transmitted from the main body 410 to the kit 420 and information transmitted from the kit 420 to the main body 410 may be different. For example, as described above, the information transmitted from the main body 410 to the kit 420 may include information for controlling the kit 420. Further, the information transmitted from the kit 420 to the main body 410 may include, for example, identification information of the kit 420 and actual operation information of the kit 420 corresponding to the control information transmitted to the kit 420. The identification information of the kit 420 may include, for example, information indicating the type of the kit 420 and version information of software related to the kit 420. The actual operation information of the kit 420 may include, for example, information on whether the kit 420 is being driven according to a set value (or an input value).

For another example, information transmitted from the kit 420 to the main body 410 may include at least one of identification information of the kit 420, operation information of the second motor 421, usage time information of the kit 420, sensed information for an object adjacent to the kit 420 and RPM operation information of the second motor 421.

In an example embodiment, the main body 410 may identify the kit 420 based on the signal transmitted by the second controller 422. In this case, the signal transmitted by the second controller 422 may include identification information for identification of the kit 420. Based on the completion of the identification of the kit 420, the main body 410 may generate and transmit a signal for controlling the second controller 422 through the first controller 413 (the transmitted signal is modulated by the first modulator 415). The reason why the kit 420 is previously identified as described above may be that when there are a plurality of kits mountable on the main body 410, control methods of at least some of the plurality of kits may be different.

Since the electronic apparatus according to an example embodiment of the present disclosure may communicate a large amount of data at high speed, it may also communicate update data related to the operation of the kit 420. In an example embodiment, the main body 410 may further include a communication part for communication with other apparatuses. In this case, the main body 410 may be connected to a server related to the electronic apparatus 400 based on wireless communication. However, the communication method is not limited to wireless communication, and various communication methods may be used. The main body 410 may acquire update data for each of one or more kits related to the electronic apparatus 400 based on the connection with the server.

Here, the one or more kits related to the electronic apparatus 400 may include one or more kits connectable to the main body 410. That is, the one or more kits related to the electronic apparatus 400 may include various kits connectable to the main body 410 in addition to the kit 420 currently connected to the main body 410. In some cases, the one or more kits related to the electronic apparatus 400 may include one or more kits including connection history with the electronic apparatus 400, and in this case, information on the one or more kits including history may be stored in the electronic apparatus 400. The electronic apparatus 400 may acquire update data for each of the one or more kits related to the electronic apparatus 400 from a server by using the stored information. The update data may include information for updating software (or firmware) of the kit, for example.

The main body 410 may store update data based on the acquisition of the update data. Meanwhile, the kit 420 may be detachable from the main body 410. In this case, the main body 410 may acquire identification information for the kit 420 in response to the connection of the kit 420. The main body 410 may identify software information of the mounted kit 420 based on the identification information on the kit 420. The main body 410 may identify whether the software of the kit 420 needs to be updated based on the identified software information. If it is required to update the software of the kit 420, for example, if the current software version of the kit 420 is out of date and an update is required, the update data may be transmitted to the kit 420 by identifying the update data corresponding to the kit 420 in the previously stored update data. Accordingly, updates to the software of the kit 420 may be made.

In some cases, the main body 410 may selectively acquire update data corresponding to the kit 420 from the server after the kit 420 is mounted. For example, the main body 410 may identify identification information of the kit 420 based on the kit 420 being connected to the main body 410. The main body 410 may acquire update data corresponding to the identified identification information from the server based on the connection with the server, and may provide the acquired update data to the kit 420.

Meanwhile, transmission of the above-described update data from the main body 410 to the kit 420 may be based on communication using the above-described electric wire.

Figure 5:
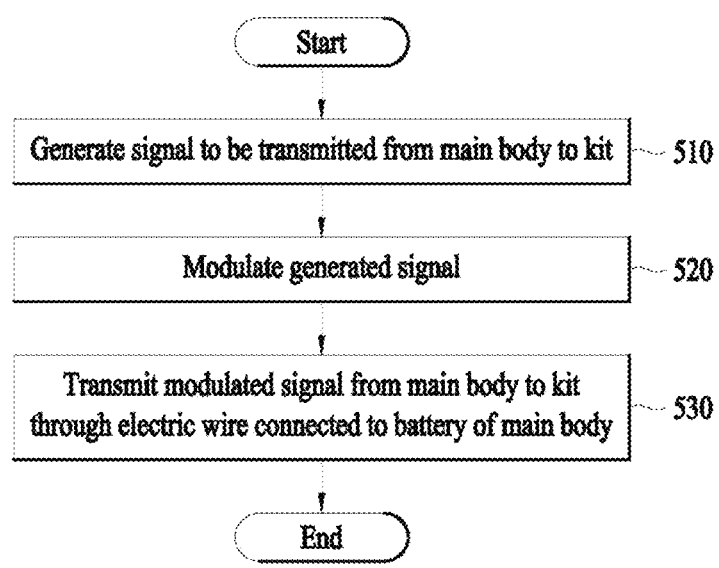
FIG. 5 is a flowchart of each step of a method of operating an electronic apparatus according to an example embodiment of the present disclosure.

FIG. 5 is a flowchart of each step of a method of operating an electronic apparatus according to an example embodiment of the present disclosure. Each step of the method illustrated in FIG. 5 may be performed in different orders from that illustrated in the drawing in some cases. In the following description of the drawing, contents overlapping with the previously described content may be omitted.

Referring to FIG. 5, the electronic apparatus may generate a signal to be transmitted from the main body to the kit in operation 510. The signal to be transmitted to the kit may include a signal including various information for controlling the kit. For example, the signal to be transmitted to the kit may include at least one of control information for suction power related to the kit, information about user input related to an operation of the kit, RPM control information of a second motor, and information about a battery.

Further, in some cases, the signal to be transmitted to the kit may include a signal requesting information from the kit. For example, a signal to be transmitted to the kit may include at least one among a signal requesting identification information of the kit, a signal requesting information about the kit's actual operating suction power, and a sensed signal detected in relation to a situation around the kit.

The electronic apparatus may modulate the generated signal in operation 520. Specifically, the electronic apparatus may generate a modulated signal (or a modulation signal) by performing modulation in which the signal to be transmitted to the kit is loaded on a carrier. In this case, the carrier may have a higher frequency than the frequency of the signal to be transmitted to the kit, and for example, it may correspond to the frequency which is equal to or higher than 1 MHz or the frequency of 10 MHz. The frequency of the carrier may be predetermined as frequency that is high frequency.

The electronic apparatus may transmit the modulated signal from the main body to the kit through an electric wire connected to the battery of the main body in operation 530.

By loading the modulated signal on the electric wire that is connected to the battery and supplies power to each component of the electronic apparatus, the electronic apparatus may transmit the signal from the main body to the kit.

Although not illustrated, in an example embodiment, the kit may include a signal receiver capable of demodulating a modulated signal. The electronic apparatus may identify the signal to be transmitted to the kit from the modulated signal using the signal receiver on the kit so that the electronic apparatus causes the kit to operate based on the identified signal.

FIG. 6 is a diagram for explaining a structure of a packet frame transmitted from an electronic apparatus according to an example embodiment of the present disclosure.

Referring to FIG. 6, the packet frame may be implemented with the maximum of 10 bytes. The packet frame may include a header, a length field, a type field, a data field, a tail and a checksum field as illustrated. In an example embodiment, the header may include various control information such as an address in the front part of the packet. The length field may indicate the length of the header. The type field may indicate the type of a service. The data field may include the content of information to be transmitted. The tail may be an area used by an error detection code. The checksum field may play the role of checking errors.

Information may be transmitted/received between the main body and the kit based on the packet frame illustrated in FIG. 6. However, the present disclosure is not limited thereto, and in some cases, a packet frame may be implemented in a way that a structure, for example, a tail is omitted.

Further, in an example embodiment, downlink data transmission from the main body to the kit may include information for controlling the operating mode of the kit, information to distinguish the kit, and information that provides suction power information. Further, the information transmitted from the kit to the main body may include floor information sensed by the kit, driving RPM information of the kit, illuminance detection information, sensed information of a 6-axis sensor, and usage time information.

FIG. 7 illustrates examples of waveforms of signals transmitted and received by an electronic apparatus according to an example embodiment of the present disclosure.

Reference numeral 710 in FIG. 7 illustrates examples of transmission/reception waveforms between the main body and the kit, and reference numeral 720 illustrates examples of demodulation waveforms of the kit. In FIG. 7, Tx data indicates transmission data (or a transmission signal), and Rx data indicates reception data (or a reception signal).

According to FIG. 7, it may be seen that the signal transmitted from the main body is received by the kit with a high success rate, and it may be seen that modulation and demodulation are effectively performed without any errors in the process of modulating the signal in the modulator and in the process of receiving the modulated signal by the signal receiver and demodulating the modulated signal. Further, even when power is supplied by transmitting the signal through such high-frequency modulation, signal transmission may not be restricted. The power supplied to the kit may be a DC power source. Meanwhile, even though power including an AC component may be supplied according to the control of the motor included in the kit, the frequency of the corresponding AC component may be lower than the carrier frequency of the modulated signal.

The signal between the main body and the kit may be transmitted and received at 115,200 bps. According to the electronic apparatus according to the present disclosure, even if there is no separate wiring for communication, a large amount of data may be effectively transmitted/received by using an electric wire used to supply power.

Figure 8:
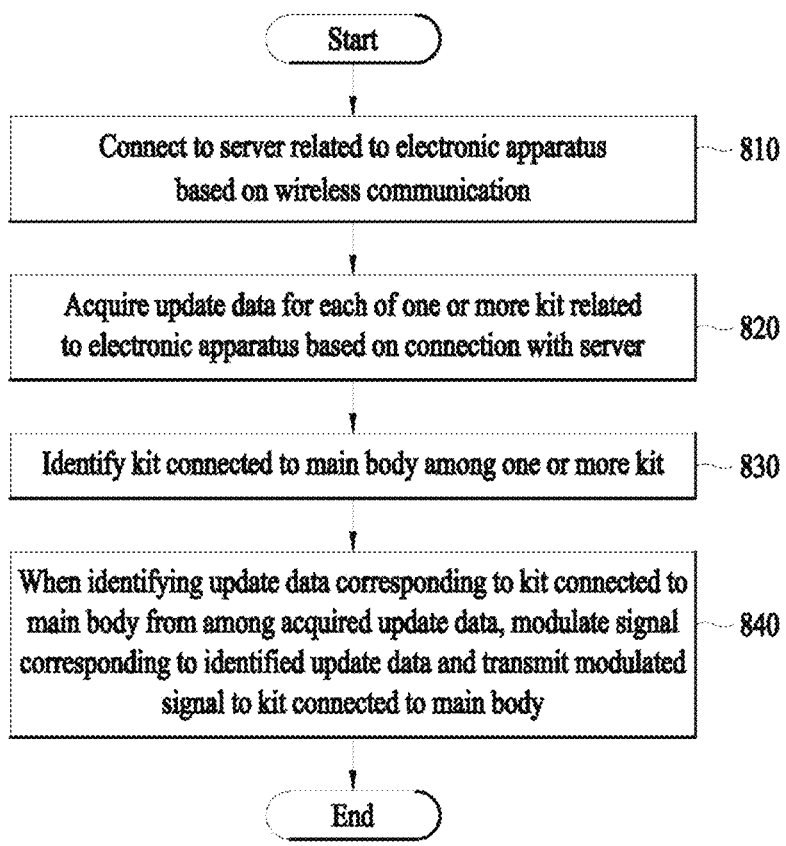
FIG. 8 is a flowchart of each step of a method of operating an electronic apparatus according to another example embodiment of the present disclosure.

FIG. 8 is a flowchart of each step of a method of operating an electronic apparatus according to another example embodiment of the present disclosure. Specifically, FIG. 8 illustrates an example of an operation method of the electronic apparatus related to software update of a kit.

Referring to FIG. 8, the electronic apparatus may be connected to a server related to the electronic apparatus based on wireless communication in operation 810. The electronic apparatus may include a component (hereinafter, referred to as a communication part) for communicating with an external apparatus. The electronic apparatus may be connected to a server related to the electronic apparatus using the communication part.

In the example embodiment, the communication part of the electronic apparatus may be connected to a Wi-Fi modem that is a separate apparatus distinguished from the electronic apparatus, and the communication part may be connected to a server related to the electronic apparatus through the Wi-Fi modem. The communication method at this time may be based on wireless communication, but is not limited thereto. Further, the Wi-Fi modem may be an apparatus that enables the connection between the electronic apparatus and other apparatuses (for example, a server and a user's smartphone). Based on the electronic apparatus being connected to the Wi-Fi modem, another apparatus connected to the Wi-Fi modem, for example, an a smartphone (or a mobile terminal) of a user of electronic apparatus may control the electronic apparatus. In this case, various information related to the electronic apparatus may be displayed on the smartphone, and for a specific example thereof, refer to FIG. 11.

The electronic apparatus may acquire update data for each of one or more kits related to the electronic apparatus based on the connection with the server in operation 820. The one or more kits related to the electronic apparatus may include one or more kits connectable to (or capable of fastening to) the main body of the electronic apparatus. The electronic apparatus may acquire information about the one or more kits in advance, and may acquire update data for the one or more kits based on the connection with the server.

In some cases, update data for each of the one or more kits may be stored in the Wi-Fi modem. For example, the Wi-Fi modem may receive update data from the server in response to the start of the update, and may store received update data. The Wi-Fi modem may provide stored update data to the electronic apparatus.

The electronic apparatus may identify a kit connected to the main body among the one or more kits in operation 830. Specifically, the electronic apparatus may acquire identification information from the kit in response to completion of connection with the kit, and may identify the connected kit based on the acquired identification information. Here, the connected kit may be one of the one or more kits related to the electronic apparatus described through operations 810 and 820 above.

In some cases, the electronic apparatus may acquire current software version information of the kit from the kit. Accordingly, the electronic apparatus may identify the software version of the kit.

When the electronic apparatus identifies update data corresponding to the kit connected to the main body from the acquired update data, the electronic apparatus may modulate a signal corresponding to the identified update data and transmit the modulated signal to the kit connected to the main body in operation 840.

Specifically, in the example embodiment, the electronic apparatus may identify whether update data corresponding to the kit is included in the update data acquired from the server based on the identification of the kit. The update data corresponding to the kit may include data for updating the current software of the kit. When update data corresponding to the kit is included in the update data acquired from the server, a signal corresponding to the update data corresponding to the kit may be modulated and transmitted to the kit connected to the main body.

The signal corresponding to the update data may be included in the signal be to transmitted to the kit, and the electronic apparatus may modulate the signal corresponding to the update data and transmit the signal to the kit through an electric wire. Based on the transmission of update data to the kit, the software of the kit may be updated.

In some cases, based on the identification of the kit, the electronic apparatus may request update data corresponding to the identified kit from the Wi-Fi modem. The electronic apparatus may receive update data from the Wi-Fi modem, and may modulate a signal corresponding to the received update data and transmit it to the kit through the electric wire. Based on the transmission of the update data to the kit, the software of the kit may be updated.

Figure 9:
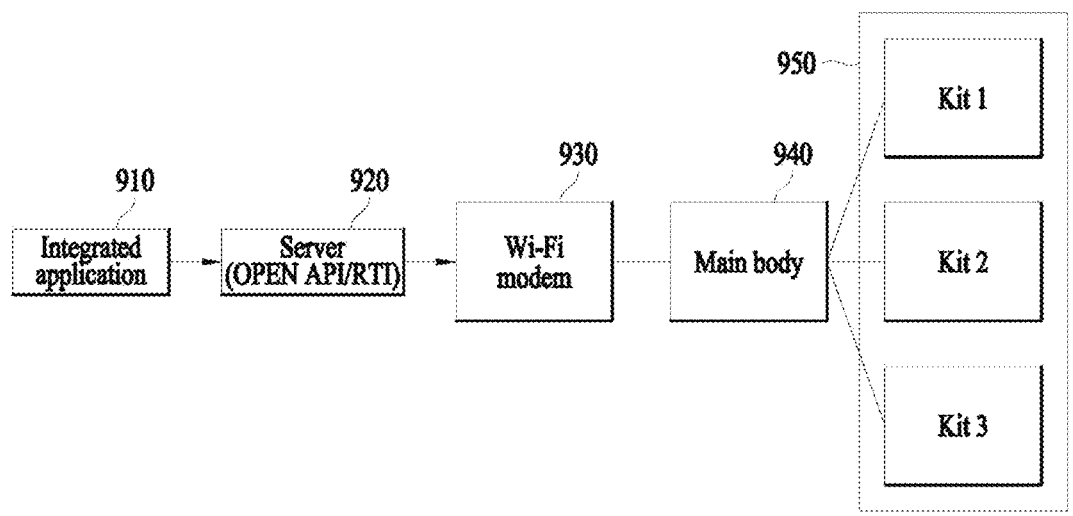
FIG. 9 is a diagram for explaining a constitution related to an update operation of an electronic apparatus according to an example embodiment of the present disclosure.

FIG. 9 is a diagram for explaining a constitution related to an update operation of an electronic apparatus according to an example embodiment of the present disclosure.

Referring to FIG. 9, an integrated application 910 for providing information to a user in relation to an update operation of the electronic apparatus and receiving a user's input may be present. According to the example embodiment, the integrated application 910 may provide various information related to the electronic apparatus in addition to the update. For example, the integrated application 910 may provide at least one of information on on/off of the electronic apparatus, information on a cleaning operation of the electronic apparatus, and information on a kit currently connected to the electronic apparatus.

In the example embodiment, the integrated application 910 may be installed in a mobile terminal of a user of the electronic apparatus and be executed in the mobile terminal. Based on the connection of the mobile terminal to a server 920, the integrated application 910 may provide various information acquired or identified from the server 920. For example, the integrated application 910 may identify whether update data related to the electronic apparatus is present in the server, and may provide information in the update data, for example, information on whether the update data is present or version information of the update data. A specific example related thereto may refer to FIG. 11.

The server 920 may be configured to store various information related to the electronic apparatus. The server 920 may be connected to the electronic apparatus through a Wi-Fi modem 930, and may be connected to a mobile terminal including the integrated application 910. In the example embodiment, the server 920 may provide update data to the electronic apparatus through the Wi-Fi modem 930.

In the example embodiment, the server 920 may receive information requesting an update of the electronic apparatus through the integrated application 910. In this case, the server 920 may transmit update data corresponding to the received information to the electronic apparatus. The update data may include update data for the kit of the electronic apparatus. However, the present disclosure is not limited thereto, and in some cases, update data of the main body may be transmitted.

In another example embodiment, the server 920 may receive information requesting update data from the electronic apparatus based on the connection with the electronic apparatus. In this case, the server 920 may transmit update data corresponding to the received information to the electronic apparatus in response to the reception of the information.

In the example embodiment, the update data transmitted from the server 920 may include update data related to one or more kits 950 mountable to a main body 940 of the electronic apparatus. Further, each of the one or more kits 950 may include identification information, and the server 920 may receive identification information for each of the one or more kits 950 from the electronic apparatus and may identify update data corresponding to each of the one or more kits 950. The server 920 may transmit update data corresponding to each of the one or more kits 950 to the electronic apparatus, specifically, to the main body 940 of the electronic apparatus regardless of an order.

The Wi-Fi modem 930 may be configured to connect the server 920 and the electronic apparatus. The Wi-Fi modem 930 may be connected to other electronic apparatuses that may share the server 920 in addition to the electronic apparatus. For example, when the electronic apparatus is a cleaner and the server 920 is a server for home Internet of Things (IoT), the other electronic apparatuses may include various electronic apparatuses (for example, a refrigerator, a washing machine and an air purifier) disposed around the cleaner.

In the example embodiment, the update data transmitted from the server 920 may be received by the main body 940 of the electronic apparatus through the Wi-Fi modem 930. The main body 940 may store the received update data. The main body 940 may be connected to one of the one or more connectable kits 950. In this case, the main body 940 may identify update data corresponding to a connected kit among the stored update data. The update data corresponding to the linked kit may include data for a software of a newer version than the current software of the kit. The main body 940 may transmit the identified update data to the connected kit. Accordingly, the kit's software may be updated.

In another example embodiment, the Wi-Fi modem 930 may receive update information for each of the one or more kits related to the electronic apparatus from the server 920 in response to an update start, and store the received update information. In this case, the electronic apparatus may request update data corresponding to the identified kit from the Wi-Fi modem based on the identification of the kit. The electronic apparatus may receive the update data from the Wi-Fi modem, may modulate a signal corresponding to the received update data and transmit the modulated signal to the kit through an electric wire. Based on the transmission of the update data to the kit, software of the kit may be updated.

In the example embodiment, the software version of the kit may have already been updated. In this case, the main body 940 may not identify update data corresponding to the identified kit, and thus the update operation may be omitted.

In the example embodiment, before or in the process of acquiring update data from the server 920, the main body 940 may be connected to a specific kit. In this case, a process of identifying and transmitting update data corresponding to the connected kit may be performed after acquiring the update data from the server 920.

In some cases, when the server 920 and the main body 940 are connected while the main body 940 is connected to a specific kit, the main body 940 may preferentially request update data for software update of the specific kit from the server 920. When the main body 940 receives the update data for the specific kit, the main body 940 may update the specific kit. Accordingly, the update of a specific kit that the current user wants to use is preferentially performed, so that the usability of the electronic apparatus may be improved.

Figure 10:
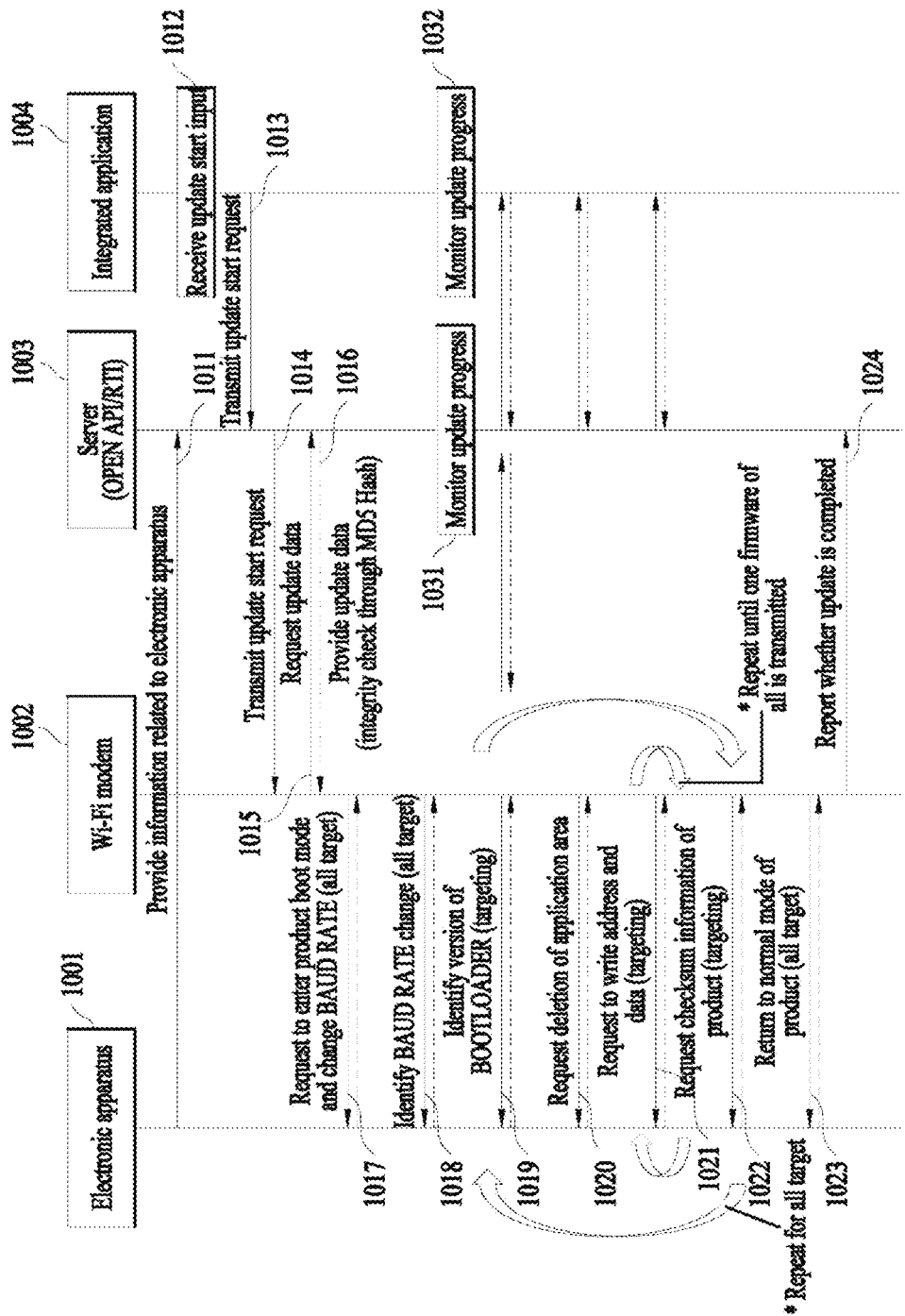
FIG. 10 is a diagram illustrating an example of a signal flow related to an update operation of an electronic apparatus according to an example embodiment of the present disclosure.

FIG. 10 is a diagram illustrating an example of a signal flow related to an update operation of an electronic apparatus according to an example embodiment of the present disclosure. Specifically, FIG. 10 illustrates the example of the signal flow related to the update operation of the electronic apparatus according to the example embodiment of the present disclosure.

Referring to FIG. 10, an electronic apparatus 1001 may be connected to a server 1003 through a Wi-Fi modem 1002. The electronic apparatus 1001 may provide information related to the electronic apparatus to the server 1003 in operation 1011. The information related to the electronic apparatus may include, for example, at least one of identification information of each of one or more kits connectable to the main body and software version information of each of the one or more kits.

An integrated application 1004 may receive an update start input from a user in operation 1012. The integrated application 1004 may transmit an update start request to the server 1003 in operation 1013. The server 1003 may transmit the update start request to the Wi-Fi modem 1002 (or the electronic apparatus 1001) in operation 1014. (The integrated application 1004 may be understood as a mobile terminal in which the integrated application is installed.)

In response to the update start request, the Wi-Fi modem 1002 may request update data from the server 1003 in operation 1015, and the server 1003 may provide the update data to the Wi-Fi modem 1002. Accordingly, the update data may be downloaded to the Wi-Fi modem 1002. The update data may be stored in the Wi-Fi modem 1002.

Based on the completion of downloading of the update data, the Wi-Fi modem 1002 may request the electronic apparatus 1001 to enter a product boot mode, which is a mode for software update, and may change the baud rate to a predetermined value in response to the update in operation 1017. In this process, a signal for entering the product boot mode and changing the baud rate may be transmitted/received between the electronic apparatus 1001 and the Wi-Fi modem 1002. Accordingly, the electronic apparatus 1001 may enter the product boot mode for installing the update data.

In response to the change in the baud rate, the electronic apparatus 1001 may transmit a signal indicating completion of the baud rate change to the Wi-Fi modem 1002, and may identify the baud rate change for the Wi-Fi modem 1002 based on the transmitted signal in operation 1018.

The Wi-Fi modem 1002 may identify the version of a bootloader of the update target (for example, software (or firmware) of the kit) in operation 1019, and may request deletion of an application area in operation 1020. Through the process of requesting to write address and update data in operation 1021 and writing data in response to the request, and the process of requesting checksum information of the kit in operation 1022 and identifying in response to the request, the software update of the kit may be completed. The software update process may be made for each of the one or more kits.

When the software update is completed, the electronic apparatus 1001 may end the boot mode and enter the normal mode (or the general mode) in operation 1023. The Wi-Fi modem 1002 may report whether the update is completed to the server 1003 in response to the completion of the update in operation 1024. In this case, the server 1003 may identify information on the current software (or firmware) version of the kit of the electronic apparatus 1001.

Although not illustrated, in some cases, the above-described request and download of update data may be made by the electronic apparatus 1001. In this case, the update data may be stored in the electronic apparatus, and operations 1017 to 1023 described above may be performed by the electronic apparatus 1001 itself.

In the example embodiment, in the process of performing the update, the Wi-Fi modem 1002 may provide information on the progress of the update to the server 1003. Accordingly, the server 1003 may monitor (or identify) the update progress of the electronic apparatus 1001 in real time or at a specific time interval in operation 1031. Monitoring information of the server 1003 may be transmitted to the integrated application 1004, and accordingly, the integrated application 1004 may monitor the update status in operation 1032.

Figure 11:
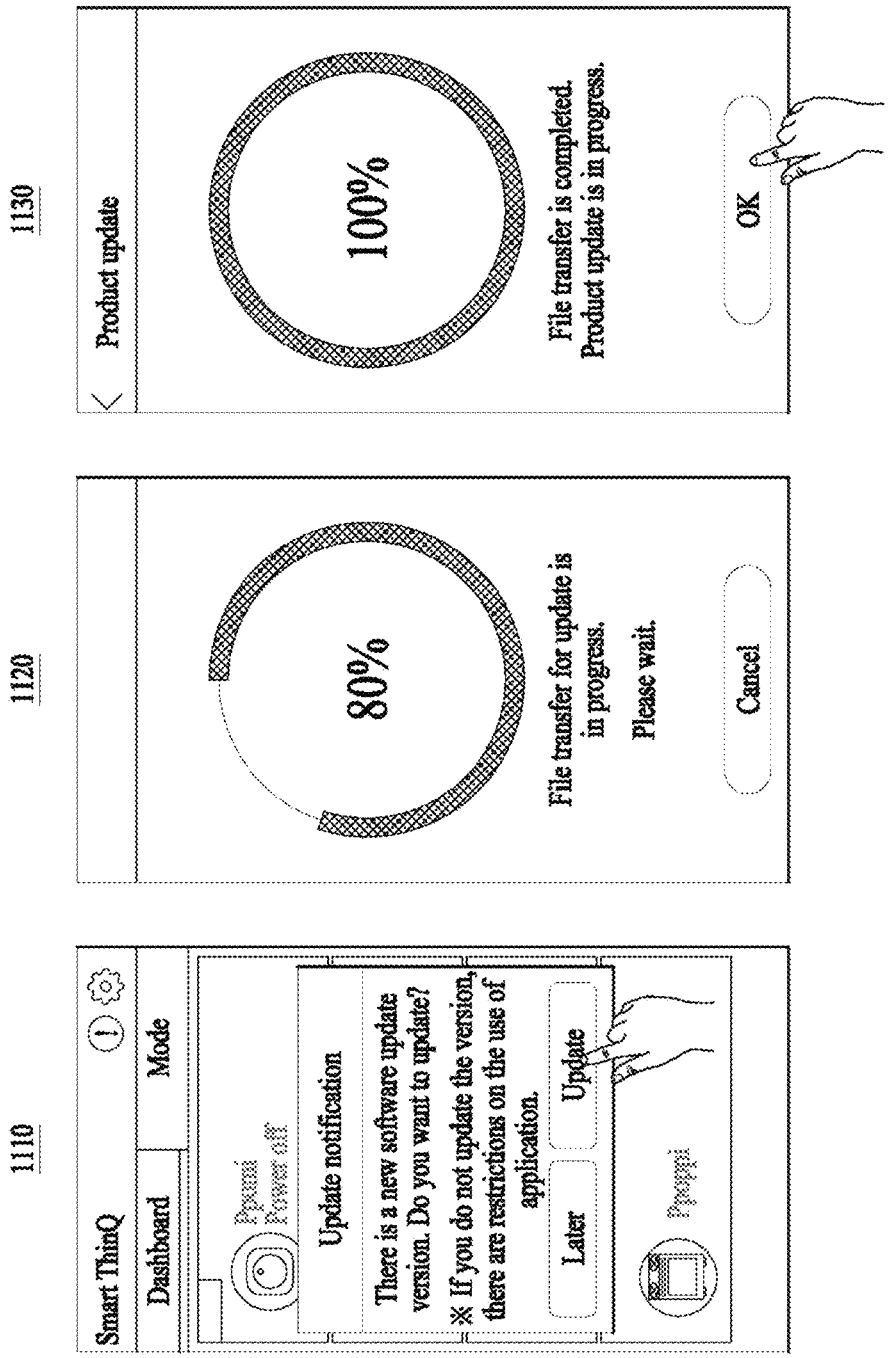
FIG. 11 illustrates examples of screens displayed in relation to an update operation of an electronic apparatus according to an example embodiment of the present disclosure.

FIG. 11 illustrates examples of screens displayed in relation to an update operation of an electronic apparatus according to an example embodiment of the present disclosure. Specifically, FIG. 11 illustrates the examples of the screens displayed on a smartphone connected to a server related to the electronic apparatus.

Reference numeral 1110 of FIG. 11 illustrates a screen displayed when there is an update related to the electronic apparatus based on the execution of an integrated application. The integrated application may be installed on a user's smartphone and connected to a server related to the electronic apparatus, and accordingly, the smartphone may provide the screen as indicated by reference numeral 1110 based on receiving information about the electronic apparatus from the server.

In reference numeral 1110, when an input for the "Update" button is received, update data may be transmitted from the server to the electronic apparatus. In this case, a screen such as reference numeral 1120 indicating that update data is being transmitted may be displayed on the smartphone.

When the transmission of update data from the server to the Wi-Fi modem or the electronic apparatus is completed, a screen such as reference numeral 1130 may be displayed on the smartphone. In this case, an update of the kit connected to the electronic apparatus may be started based on the user's input of the "OK" button.

The electronic apparatus and the method of operating the same according to the example embodiments of the present disclosure enable data communication between the main body and the kit to be performed using an electric wire for providing power, so that communication between the main body and the kit is possible even without a separate wire for data communication.

Further, in the electronic apparatus and the method of operating the same according to the example embodiments of the present disclosure, a signal corresponding to data may be modulated using a high-frequency carrier, and communication may be performed based on the modulation. Thus, high-speed data communication may be effectively performed together with power supply.

The above description is merely illustrative of the technical idea of the present disclosure, and various modifications and variations will be possible without departing from the essential quality of the present disclosure by those of ordinary skill in the art to which the present disclosure belongs. Therefore, the example embodiments in the present disclosure are intended to explain, not to limit the technical spirit of the present disclosure, and the scope of the technical spirit of the present disclosure is not limited to the example embodiments. The scope to be protected of the present disclosure should be construed by the following claims, and all technical ideas within the scope of the claims and equivalents should be construed as being included in the scope of the present disclosure.

The invention claimed is:

1. An electronic apparatus comprising a main body and a kit connected to the main body,
wherein the main body comprises a battery, a first motor, an electric wire connected to the battery and a first controller connected to the electric wire,
wherein the kit comprises a second motor supplied with power through the electric wire and a second controller connected to the electric wire,
wherein the first controller comprises a first signal generator configured to generate a signal to be transmitted to the kit and a first modulator configured to modulate the signal generated by the first signal generator,
wherein the signal modulated by the first modulator is transmitted to the second controller through the electric wire, and
herein the main body identifies the kit based on a signal transmitted by the second controller, and transmits a signal for controlling the second controller through the first controller.

2. The electronic apparatus of claim 1, wherein the first controller is connected to the electric wire at a location between the battery and the second controller, and
wherein the electric wire comprises a first LC filter located between the battery and the first controller.

3. The electronic apparatus of claim 1, wherein the first modulator performs on-off keying (OOK).

4. The electronic apparatus of claim 1, wherein a frequency of a carrier related to the first modulator is higher than a frequency of a signal generated by the first signal generator, and the frequency of the carrier is equal to or higher than 1 MHz.

5. The electronic apparatus of claim 1, wherein the first controller further comprises a first signal receiver configured to receive a signal transmitted by the second controller, and
wherein the first signal receiver comprises a first OP-Amp and a first envelope detector.

6. The electronic apparatus of claim 5, wherein the first signal receiver further comprises a first RC filter connected to a non-inverting input terminal of the first OP-Amp, and
wherein the first envelope detector is connected to an inverting input terminal of the first OP-Amp.

7. The electronic apparatus of claim 6, further comprising a first capacitor located between the first RC filter and the first envelope detector, and the electric wire.

8. The electronic apparatus of claim 1, wherein the second controller is connected to the electric wire at a location between the main body and the second motor, and
wherein the kit comprises a second LC filter located between the second controller and the second motor.

9. The electronic apparatus of claim 1, wherein the second controller further comprises a second signal receiver configured to receive a signal transmitted by the first controller, a second signal generator configured to generate a signal to be transmitted to the main body, and a second modulator configured to modulate the signal generated by the second signal generator,
wherein the second signal receiver further comprises a second OP-Amp, a second envelope detector connected to an inverting input terminal of the second OP-Amp, and a second RC filter connected to a non-inverting input terminal of the second OP-Amp, and
wherein a second capacitor is located between the second RC filter and the second envelope detector, and the electric wire.

10. The electronic apparatus of claim 1, wherein the first controller transmits at least one among control information for suction power related to the kit, information on a user input related to an operation of the kit, revolution per minute (RPM) control information of the second motor and information on the battery, to the second controller.

11. The electronic apparatus of claim 1, wherein the second controller transmits at least one among identification information of the kit, operation information of the second motor, usage time information of the kit, sensed information for an object adjacent to the kit and RPM operation information of the second motor, to the first controller.

12. The electronic apparatus of claim 1, wherein the first controller transmits a signal modulated through the first modulator based on AC coupling from the main body to the kit through the electric wire.

13. The electronic apparatus of claim 1, wherein the main body is connected to a server related to the electronic apparatus based on wireless communication, and acquires update data for each of one or more kits related to the electronic apparatus based on a connection with the server.

14. The electronic apparatus of claim 1, wherein the kit is detachable from the main body, and
wherein, based on identification that the kit is mounted, the main body identifies software information of the mounted kit, identifies whether or not the software of the mounted kit needs to be updated based on the identified software information, and when the software of the mounted kit needs to be updated, transmits update data to the kit.

15. A method of operating an electronic apparatus comprising a main body and a kit connected to the main body, the method comprising:
generating a signal to be transmitted from the main body to the kit;
modulating the generated signal; and
transmitting the modulated signal from the main body to the kit through an electric wire connected to a battery of the main body,
wherein the main body comprises the battery, a first motor, the electric wire, and a first controller connected to the electric wire,
wherein the kit comprises a second motor supplied with power through the electric wire, and a second controller connected to the electric wire, and
wherein the main body identifies the kit based on a signal transmitted by the second controller, and transmits a signal for controlling the second controller through the first controller.

16. The method of claim 15, wherein the second controller transmits at least one of identification information of the kit, operation information of the second motor, usage time information of the kit, sensed information for an object adjacent to the kit, or RPM operation information of the second motor to the first controller.

17. The method apparatus of claim 15, wherein the first controller transmits a signal modulated through the first modulator based on AC coupling from the main body to the kit through the electric wire.

18. The method of claim 15, wherein the main body is connected to a server related to the electronic apparatus based on wireless communication, and acquires update data for each of one or more kits related to the electronic apparatus based on a connection with the server.

19. The method of claim 15, wherein the kit is detachable from the main body, and
  wherein, based on identification that the kit is mounted, the main body identifies software information of the mounted kit, identifies whether the software of the mounted kit should be updated based on the identified software information, and when the software of the mounted kit should be updated, transmits update data to the kit.

20. A method of operating an electronic apparatus comprising a main body and a kit connected to the main body, the method comprising:

connecting to a server related to the electronic apparatus based on wireless communication;
  acquiring update data for each of one or more kits related to the electronic apparatus based on a connection with the server;
  identifying the kit connected to the main body among the one or more kits; and
  when update data corresponding to the kit connected to the main body is identified in the acquired update data, modulating a signal corresponding to the identified update data and transmitting a modulated signal from the main body to the kit connected to the main body through an electric wire connected to a battery of the main body,
  wherein the main body comprises the battery, a first motor, the electric wire and a first controller connected to the electric wire, and
  wherein the kit comprises a second motor supplied with power through the electric wire, and a second controller connected to the electric wire.

\* \* \* \* \*